United States Patent [19]

Olson

[11] Patent Number: 5,179,470
[45] Date of Patent: Jan. 12, 1993

[54] AERODYNAMIC VEHICLE MIRROR HEAD

[75] Inventor: M. Eugene Olson, Fort Wayne, Ind.

[73] Assignee: Navistar International Transportation Corp., Chicago, Ill.

[21] Appl. No.: 715,513

[22] Filed: Jun. 14, 1991

[51] Int. Cl.⁵ .............................................. G02B 7/18
[52] U.S. Cl. .................................. 359/509; 359/507; 359/871
[58] Field of Search ................ 359/507, 509, 843, 871

[56] References Cited

U.S. PATENT DOCUMENTS

| | | | |
|---|---|---|---|
| 3,059,540 | 10/1962 | Robinson. | |
| 4,248,497 | 2/1981 | Leighton | 359/509 |
| 4,439,013 | 3/1984 | Hagn et al. | 359/507 |
| 4,449,796 | 5/1984 | Janssen et al. | 359/507 |
| 4,550,988 | 11/1985 | Harder et al. | |
| 4,718,755 | 1/1988 | Olson et al. | |
| 4,821,283 | 4/1989 | Wildermuth et al. | 359/509 |
| 4,869,581 | 9/1989 | Matulich | 359/509 |
| 4,898,458 | 2/1990 | McDonald | 359/509 |
| 4,979,809 | 12/1990 | Peters | 359/509 |
| 5,069,538 | 12/1991 | Shust et al. | 359/509 |

FOREIGN PATENT DOCUMENTS 1475058 6/1977 United Kingdom.

*Primary Examiner*—Bruce Y. Arnold
*Assistant Examiner*—J. P. Ryan
*Attorney, Agent, or Firm*—Dennis K. Sullivan

[57] ABSTRACT

An aerodynamic vehicle side mirror head of the vertically elongated rectangular type commonly used on large vehicles such as trucks includes an aerodynamically shaped mirror housing having a reflecting surface mounted to a rearward facing surface thereof and a set of cambered, airfoil-shaped, turning vanes with an upstream vane located along the leading vertical edge of the mirror housing on the side thereof closest to the vehicle can and having an outlet disposed to direct airflow exiting therefrom laterally onto the mirror surface and a downstream vane located along the trailing vertical edge on the opposite side of the mirror housing and having an outlet disposed to direct air flowing therethrough in a substantially downstream direction. The vanes are shaped and geometrically optimized relative to the mirror housing surface to significantly reduce the size of the downstream wake, effectively reducing the aerodynamic drag of the mirror head, and at the same time, causing scrubbing of the downstream face of the mirror, effectively keeping it free of water droplets and dirt.

14 Claims, 1 Drawing Sheet

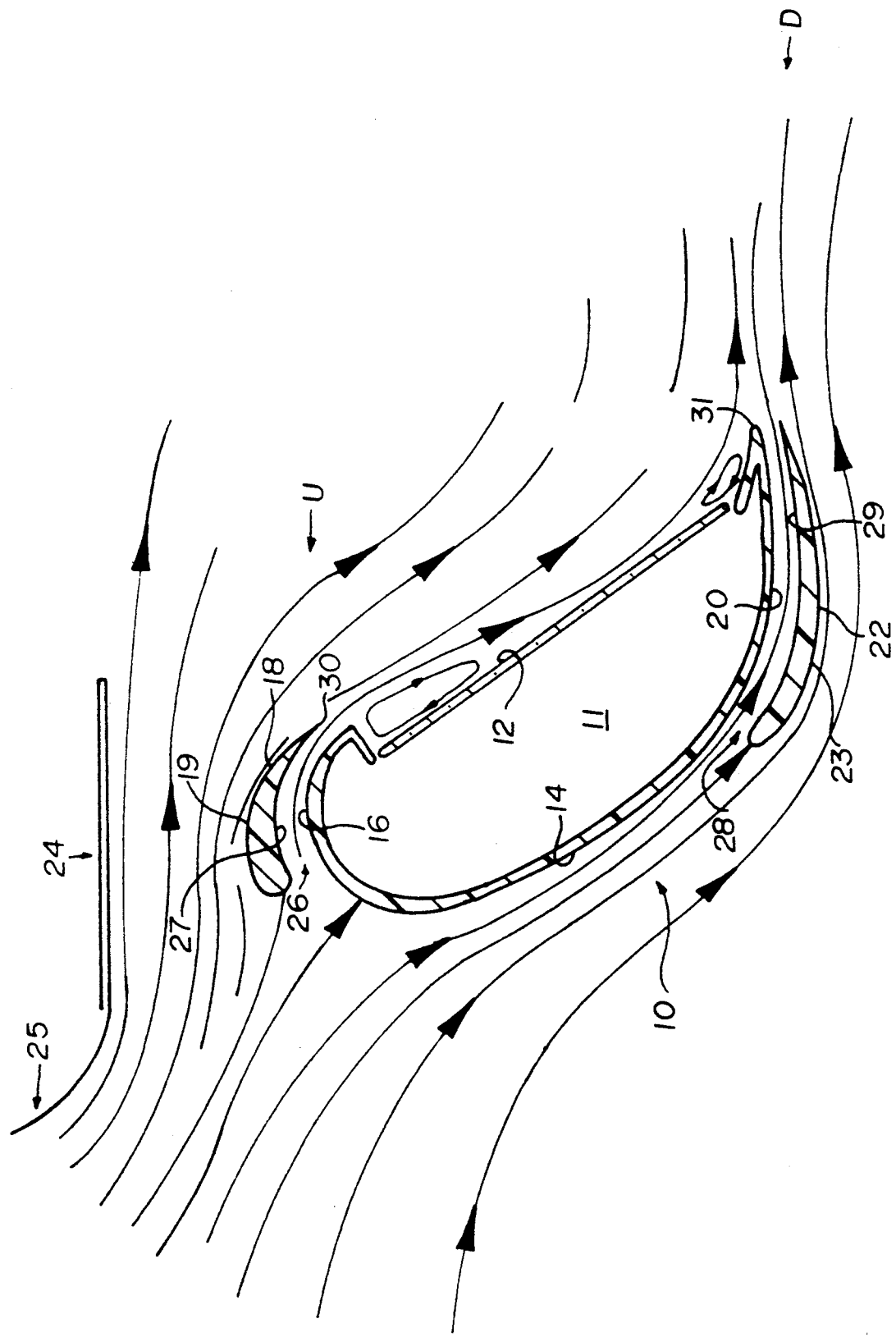

AERODYNAMIC VEHICLE MIRROR HEAD

BACKGROUND OF THE INVENTION

The present invention relates to an aerodynamic vehicle mirror head which combines an aerodynamically shaped housing for the mirror head with an upstream vane on the side of the mirror head adjacent the vehicle for causing air scrubbing of the mirror surface and a downstream vane on the opposite side of the mirror head for closing down and reducing the size of the downstream wake of the mirror flow field. The mirror head is especially suited for use on a large vehicle such as a truck or bus.

THE PRIOR ART

Heretofore, aerodynamic vehicle mirror heads including upstream turning vanes have been proposed for use on automobiles as well as on larger vehicles, such as trucks and busses. U.S. Pat. No. 4,718,755 to Olson et al. discloses an upstream turning vane which is mounted on a mirror assembly for capturing, turning and ejecting an airstream across the surface of the mirror, creating an air jet barrier which protects the mirror surface from deposition of airborne dirt, fluid and other matter thereon. British Patent Specification No. 1,475,058 discloses a similar upstream turning vane for sweeping the mirror surface and a secondary vane incorporated therewith for sweeping the side window of the vehicle as well. U.S. Pat. No. 3,059,540 discloses a circular rear view mirror including an annular channel disposed thereabout having an open side directed toward the front of the vehicle to form an air trap. The channel has numerous passages disposed circumferentially adjacent the mirror surface to direct the air trapped in the channel thereacross. U.S. Pat. No. 4,550,988 discloses a side rear view mirror cleaning system which includes a downstream turning vane which redirects the air stream forwardly on to the mirror surface and a fluid dispenser which selectively injects fluid into the redirected air stream to clear the mirror surface of foreign materials such as insects, dust, dirt, mud, snow, ice and rain.

Such prior art mirror designs create downstream flow fields including a wake which is larger than the mirror body itself. Even aerodynamic designs create a wake which, although reduced in size, is still approximately equal to the size of the mirror head itself.

The key to producing a more effective aerodynamic design is to design the mirror head to have a shape which effectively causes the downstream wake to collapse or close. The traditional approach to solving this problem would produce a mirror body too large to be functionally adequate, also creating a safety hazard by inhibiting driver visibility.

SUMMARY OF THE INVENTION

Accordingly it is a primary object of the present invention to combine an aerodynamically shaped mirror housing with a set of cambered airfoil-shaped turning vanes located respectively along the upstream edge of the mirror, to sweep the mirror surface, and along the downstream edge but directed generally downstream, to reduce the size of the downstream wake.

According to the invention, there is provided an aerodynamic vehicle side mirror head of the vertically elongated rectangular type commonly used on large vehicles such as trucks. The mirror head includes an aerodynamically shaped mirror housing having a reflecting surface mounted to a rearward facing surface thereof and a set of cambered, airfoil-shaped, turning vanes with an upstream vane located along the leading vertical edge of the mirror housing on the side thereof closest to the vehicle cab and having an outlet disposed to direct airflow exiting therefrom laterally onto the mirror surface and a downstream vane located along the trailing vertical edge on the opposite side of the mirror housing and having an outlet disposed to direct air flowing therethrough in a substantially downstream direction. The vanes are shaped and geometrically optimized relative to the mirror housing surface to significantly reduce the size of the downstream wake, effectively reducing the aerodynamic drag of the mirror head, and at the same time, causing scrubbing of the downstream face of the mirror, effectively keeping it free of water droplets and dirt. Additionally, the addition of the downstream vane improves the performance of the upstream vane by creating a low pressure area adjacent the downstream edge of the mirror surface thereby improving airflow across the mirror surface.

BRIEF DESCRIPTION OF THE DRAWING

Other objects and advantages of the invention will become more apparent upon perusal of the detailed description thereof and upon inspection of the drawing which is a horizontal cross section through an aerodynamic vehicle mirror head constructed in accordance with the present invention.

DESCRIPTION OF THE PREFERRED EMBODIMENT

Referring now to the drawing in greater detail, there is illustrated a horizontal cross section through an aerodynamically shaped mirror head 10 of the conventional vertically-elongated, rectangular type commonly used on highway trucks and similar vehicles and which is generally mounted to the vehicle 25 by brackets (not shown) attached to the top and bottom surfaces of the mirror housing adjacent the side window 24 of the vehicle. An example of such a mirror may be found by reference to the aforementioned U.S. Pat. No. 4,718,755.

As shown, the mirror head 10 includes an aerodynamically shaped housing 11 which has an arcuate leading wall 14 facing the oncoming airflow (shown by arrows) caused by the forward motion of the vehicle 25, a relatively lower radius of curvature side wall 16 on the vehicle side of the mirror head, and a relatively larger radius of curvature side wall 20 on the opposite side of the mirror head. The rearward portion of the housing 11 is provided with a rearwardly outwardly angled reflecting surface 12 which may be fixedly attached or adjustably mounted to the housing 11 depending on the type of mounting of the housing 11 to the vehicle 25.

An upstream turning vane 18 is positioned adjacent the entire vertical length of an upstream lateral wall 16 of the mirror housing 11 to define an upstream airflow passage 27 therebetween and a downstream turning vane 22 is positioned along the entire vertical length of a downstream lateral wall 20 of the mirror housing to define a downstream airflow passage 29 therebetween. The vanes 18 and 22 are shown to be in the shape of a curvilinear or highly cambered airfoil, with the downstream vane 22 being elongated relative to the upstream vane 18. As shown, the upstream and downstream passages 27, 29 have entrances 26, 28 generally transverse to the direction of oncoming airflow which has been split to follow the housing wall 14. The passages 27, 29 decrease in cross section as they proceed toward their respective exits 30, 31 to increase the airflow velocity at the exits.

The upstream vane 18 is positioned so that the passage 27 captures a portion of the oncoming airflow and directs same around the curved upstream wall 16 of the housing 14 and out the exit 30 at increased velocity onto and across the reflecting surface 12. This airflow creates a scrubbing action on the mirror surface 12 to keep it essentially free of water and dirt particles. The shape of the exterior surface 19 as well as the fore-and-aft and angular positioning of the upstream high camber airfoil vane 18 reduces the tendency of the airflow flowing around the outside of the mirror head to separate from the exterior surface 19. Rather, the airflow tends to follow the surface as shown and move laterally around the vane 18 toward the downstream side reducing the width of the wake U on the upstream side.

The downstream vane 22 captures airflow travelling along the curvilinear outer wall 20 of the mirror housing 14 into passage 29 and directs the airflow out of the exit 31 at increased velocity in a substantially rearward direction but slightly laterally behind the mirror head 10 to reduce the size of the wake. By the addition of the downstream vane 22, it has been determined through empirical testing that a significant decrease in the size of the downstream side D of the wake created by the mirror head 10 is produced. Further, the shape of the exterior surface 23 as well as the fore-and-aft and angular positioning of the downstream cambered airfoil vane 22 reduces the tendency of the airflow flowing around the outside of the mirror head to separate from the exterior surface 23. Rather the airflow tends to follow the surface as shown and move laterally around the vane 22 toward the trailing end thereof whereat it is directed toward a point laterally behind the mirror head thus further reducing the width of the downstream side D of the wake.

The mirror head 10, as shown by the arrows in the drawing, generates only a nominal wake bounded by U and D and has significantly reduced aerodynamic drag, resulting in increased fuel economy for a vehicle onto which such mirror head 10 is mounted.

It will be understood that the vanes 18 and 22 are disposed in fixed positioned relative to the mirror housing 4 substantially as shown in the drawing. This geometrically optimized position has been determined by empirical testing to produce the most significant decrease in drag created by the mirror head 10 while not compromising other benefits of the mirror head 10.

As described above, the mirror head has a number of advantages, some of which have been described above and others of which are inherent in the present invention. It will be appreciated by those of ordinary skill in the art that modifications and alterations may be made to the mirror head without departing from the teachings of the present invention. Accordingly, the scope of the invention is only to be limited in accordance with the accompanying claims.

What is claimed is:

1. An aerodynamic vehicle mirror head of the vertically elongated rectangular type comprising a housing having an arcuate forward wall, a vehicle-side side wall adapted to be disposed adjacent the vehicle, and an outside side wall disposed away from the vehicle, a reflecting surface disposed on a rearwardly facing portion of said housing, said mirror head further comprising an upstream turning vane disposed adjacent said vehicle-side side wall and defining therebetween an upstream passage for receiving a portion of oncoming airflow and redirecting said portion of said airflow across the reflecting surface and a downstream turning vane disposed adjacent said outside side wall and defining therebetween a downstream passage for receiving another portion of said oncoming airflow and redirecting said another portion of said airflow in a substantially rearward direction from an exit adjacent trailing edge of said housing to effectively diminish the size of the downstream wake created by the mirror head.

2. The mirror head of claim 1 wherein said another portion of said airflow exits from said downstream passage in a direction downstream from and laterally behind said mirror head.

3. The mirror head of claim 1 wherein said vanes are of an airfoil shape in cross section.

4. The mirror head of claim 1 wherein said vanes are of a cambered airfoil shape in cross section.

5. The mirror head of claim 1 wherein said upstream passage formed between said upstream vane and said mirror housing decreases in cross-sectional area toward the exit therefrom.

6. The mirror head of claim 5 wherein said decreasing diameter channel creates increased velocity airflow and directs same around an arcuate upstream vehicle-side side wall of the mirror housing onto and across the mirror surface.

7. The mirror head of claim 1 wherein said downstream vane terminates rearwardly of said trailing end of said mirror housing.

8. The mirror head of claim 7 wherein said downstream passage formed between said downstream vane and said opposite wall decreases in cross-sectional area toward the exit therefrom.

9. The mirror head of claim 1 wherein said downstream passage formed between said downstream vane and said outside wall decreases in cross-sectional area toward the exit therefrom.

10. The mirror head of claim 1 wherein said vanes are disposed in fixed position relative to said casing.

11. An aerodynamic vehicle mirror head including a housing and a reflecting surface suitably engaged to a rearward portion of said housing, said housing having an aerodynamically shaped cross-section integrally an upstream vehicle-side arcuate side wall adapted to be disposed adjacent a vehicle window and a downstream trailing outside side wall on an opposite side of said mirror head from said vehicle-side wall; an upstream turning vane disposed in fixed position adjacent said vehicle-side wall and forming therewith a passage therebetween decreasing width, said passage terminating at a point in a direction relative to said reflecting surface disposed to create an increased velocity stream of air thereacross; and, a downstream turning vane disposed in fixed position adjacent said trailing outside wall and forming therewith a downstream passage terminating at a point and in a direction directing the airflow substantially rearwardly and behind said mirror head.

12. The mirror head of claim 11 wherein an exterior surface of said upstream turning vane is aerodynamically shaped to cause airflow about said exterior surface to continue to follow said surface to the end of said turning vane.

13. The mirror head of claim 12 wherein an exterior surface of said downstream turning vane is aerodynamically shaped to cause airflow about said exterior surface to continue to follow said surface to the end of said turning vane.

14. A mirror head of the type extending outwardly of a motor vehicle with its reflecting surface disposed generally downstream of the direction of the flow of oncoming air, said mirror head having a housing including an upstream side wall on the vehicle side thereof and an aerodynamically shaped upstream turning vane attached to the housing and disposed adjacent said upstream side wall and defining therewith an air passage having an entrance generally transverse to the flow of oncoming air and an exit disposed to redirect oncoming airflow onto and across said mirror surface; and said housing further including a downstream side wall and an aerodynamically shaped downstream turning vane attached to the body and disposed adjacent said downstream side wall and defining therewith an air passage therebetween having an entrance generally transverse to the flow of oncoming air and an exit disposed to direct oncoming airflow rearwardly of said downstream side wall of said housing to close down and thereby reduce the size of the downstream wake created by the mirror head.

* * * * *